(12) United States Patent
Suzuki et al.

(10) Patent No.: US 12,390,918 B2
(45) Date of Patent: Aug. 19, 2025

(54) ELECTRIC WORKING MACHINE

(71) Applicant: Makita Corporation, Anjo (JP)

(72) Inventors: Daisuke Suzuki, Anjo (JP); Masayoshi Okumi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 85 days.

(21) Appl. No.: 18/166,569

(22) Filed: Feb. 9, 2023

(65) Prior Publication Data

US 2023/0264337 A1   Aug. 24, 2023

(30) Foreign Application Priority Data

Feb. 24, 2022   (JP) .................. 2022-026616

(51) Int. Cl.
| | | |
|---|---|---|
| B25F 5/02 | (2006.01) | |
| F16K 17/36 | (2006.01) | |
| B27B 17/00 | (2006.01) | |
| B27B 17/02 | (2006.01) | |

(52) U.S. Cl.
CPC .............. B25F 5/02 (2013.01); F16K 17/366 (2013.01); B27B 17/0008 (2013.01); B27B 17/02 (2013.01)

(58) Field of Classification Search
CPC . B25F 5/008; B25F 5/02; B27B 17/00; B27B 17/0008; B27B 17/02; F16K 15/04; F16K 17/366
USPC ........................................................ 173/217
See application file for complete search history.

(56) References Cited

U.S. PATENT DOCUMENTS

| | | | | |
|---|---|---|---|---|
| 6,739,490 | B1* | 5/2004 | Shkolnikov | B25C 1/08 227/119 |
| 7,316,855 | B2* | 1/2008 | Lawrence | H01M 8/04201 429/492 |
| 7,674,540 | B2* | 3/2010 | Adams | H01M 8/04201 422/187 |
| 2005/0064264 | A1* | 3/2005 | Ito | H01M 8/1009 429/513 |
| 2005/0202310 | A1* | 9/2005 | Yahnker | H01M 50/24 429/62 |
| 2011/0162862 | A1* | 7/2011 | Suzuki | B25F 5/00 173/217 |
| 2012/0066916 | A1* | 3/2012 | Heinzelmann | B25F 5/008 173/217 |
| 2014/0338948 | A1* | 11/2014 | Hester | B25F 5/02 173/171 |
| 2018/0226703 | A1* | 8/2018 | Inoue | H01M 10/6565 |

(Continued)

FOREIGN PATENT DOCUMENTS

| | | |
|---|---|---|
| JP | H8085077 A | 4/1996 |
| JP | 2011-140094 A | 7/2011 |
| JP | 2019-217569 A | 12/2019 |

OTHER PUBLICATIONS

Office Action mailed Jun. 17, 2025 in Japanese Application No. 2022-026616.

*Primary Examiner* — Tanzim Imam
(74) *Attorney, Agent, or Firm* — Sughrue Mion, PLLC

(57) ABSTRACT

An electric working machine may include: an electrical component; a first space in which the electrical component is disposed; a partition wall separating the first space from a second space different from the first space, the partition wall including a first communication opening communicating the first space and the second space; and a first one-way valve disposed at the first communication opening.

10 Claims, 10 Drawing Sheets

(56) References Cited

U.S. PATENT DOCUMENTS

2018/0313369 A1* 11/2018 Breslin .................... F04F 1/08
2023/0264337 A1* 8/2023 Suzuki .................... B25F 5/008
 173/217
2024/0299612 A1* 9/2024 Brune .................... A62B 18/08

* cited by examiner

ELECTRIC WORKING MACHINE

REFERENCE TO RELATED APPLICATIONS

This application claims priority to Japanese Patent Application No. 2022-026616, filed on Feb. 24, 2022, the entire contents of which are hereby incorporated by reference into the present application.

TECHNICAL FIELD

The disclosure herein relates to an electric working machine.

BACKGROUND ART

US Patent Application Publication No. 2012/66916 describes an electric working machine. The electric working machine includes an electrical component, a first space in which the electrical component is disposed, and a partition wall separating the first space from a second space different from the first space and including a first communication opening communicating the first space and the second space.

DESCRIPTION

In the electric working machine above, when liquid is in the first space, the liquid can be discharged from the first space to the second space through the first communication opening. However, when liquid is in the second space, the liquid may enter the first space from the second space through the first communication opening and contact the electrical component. The disclosure herein provides a technology that allows discharge of liquid from a first space to a second space and suppresses entry of liquid into the first space from the second space.

An electric working machine disclosed herein may comprise an electrical component; a first space in which the electrical component is disposed; a partition wall separating the first space from a second space different from the first space, the partition wall including a first communication opening communicating the first space and the second space; and a first one-way valve disposed at the first communication opening.

According to the configuration above, when liquid is in the first space, opening the first one-way valve allows the liquid to be discharged from the first space to the second space through the first one-way valve. Further, when liquid is in the second space, closing the first one-way valve suppresses entry of the liquid into the first space from the second space through the first one-way valve.

Figure 5:
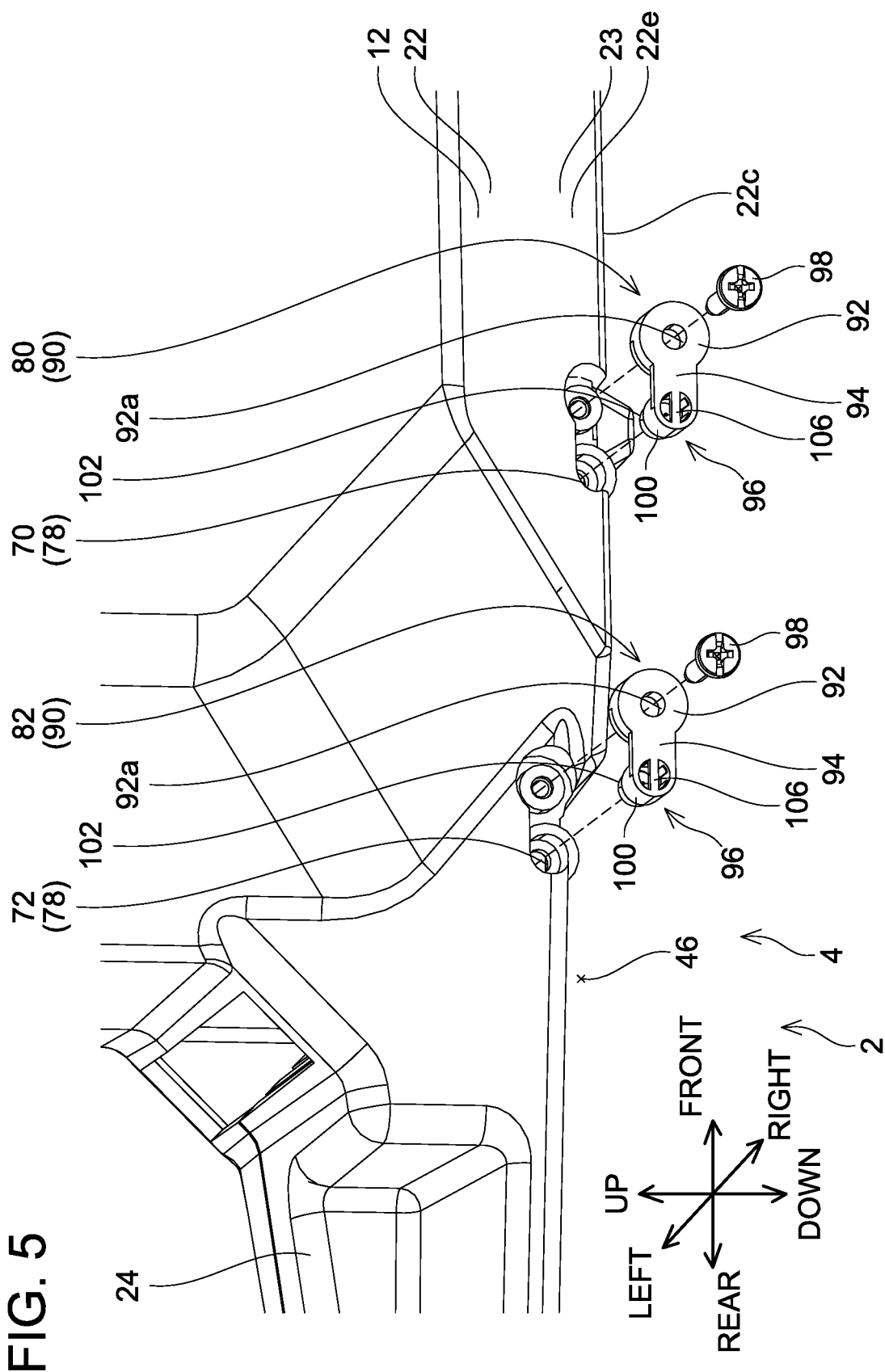

FIG. 5 is an exploded perspective view of a lower portion of a right wall 22e of a body housing 22 near a rear end thereof in the electric working machine 2 according to the embodiment.

Figure 6:
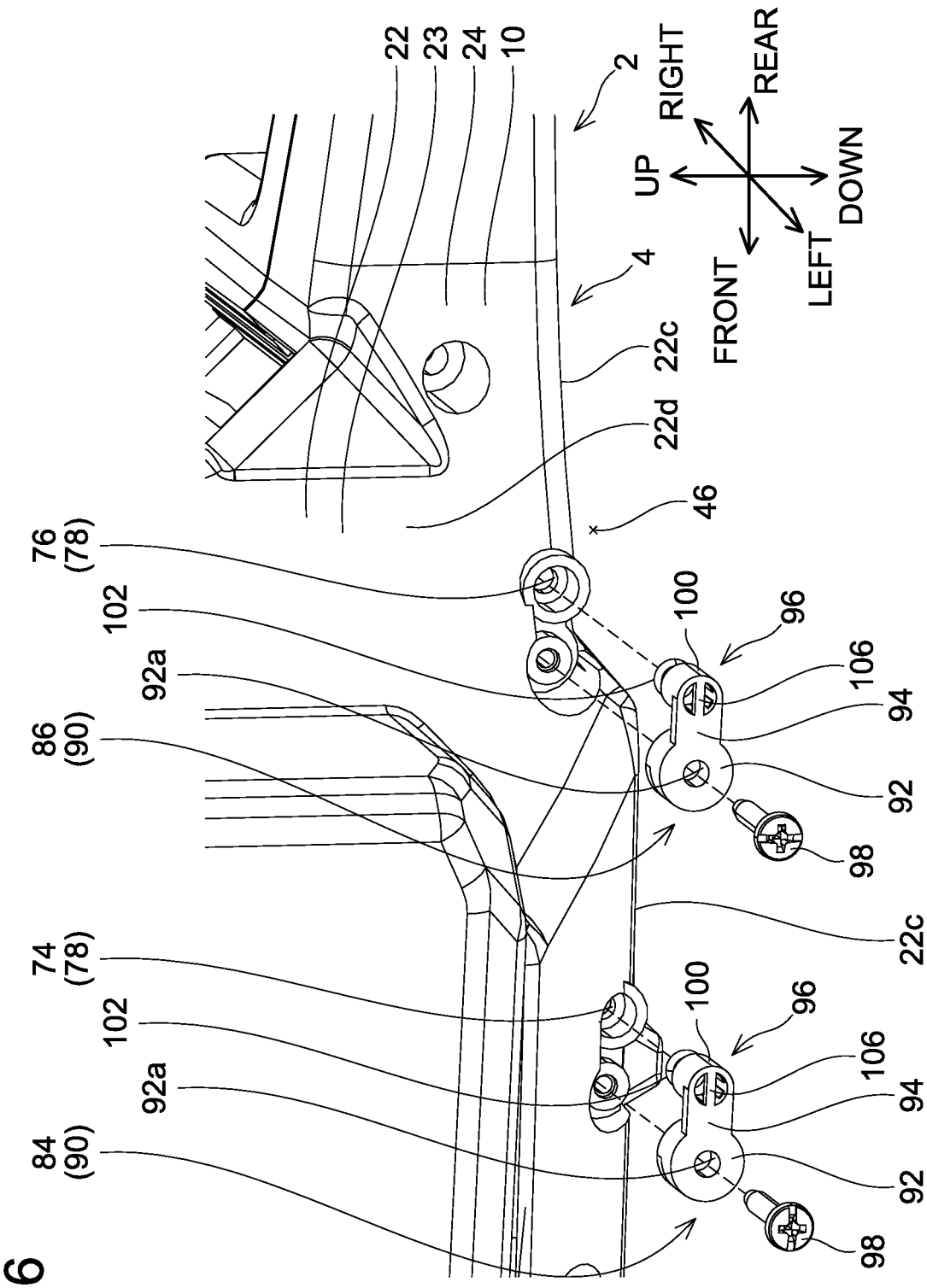

FIG. 6 is an exploded perspective view of a lower portion of a left wall 22d of the body housing 22 near a rear end thereof in the electric working machine 2 according to the embodiment.

Figure 7:
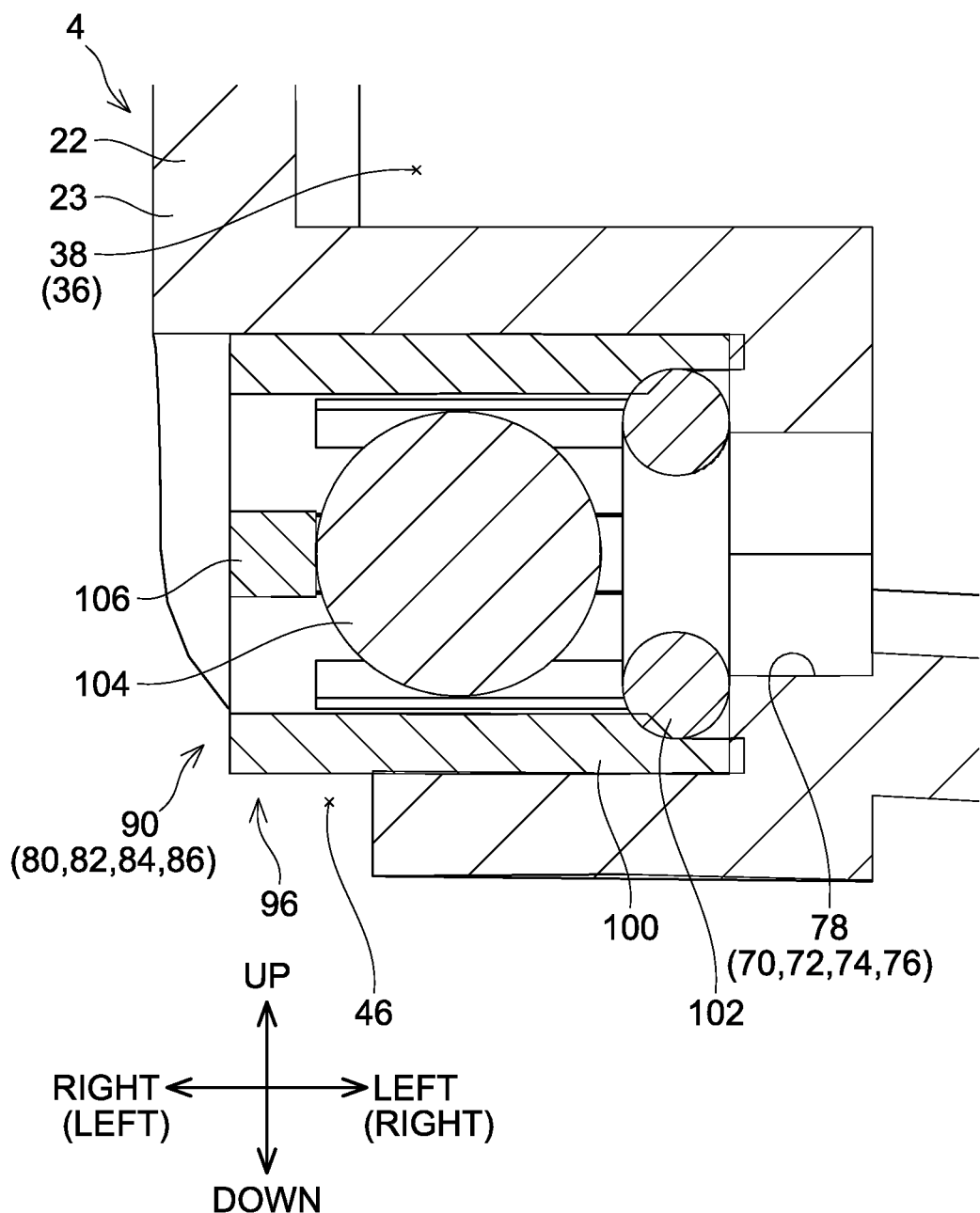

FIG. 7 is a cross-sectional view of the electric working machine 2 according to the embodiment in the vicinity of a one-way valve 90, where a communication opening 78 is open.

Figure 8:
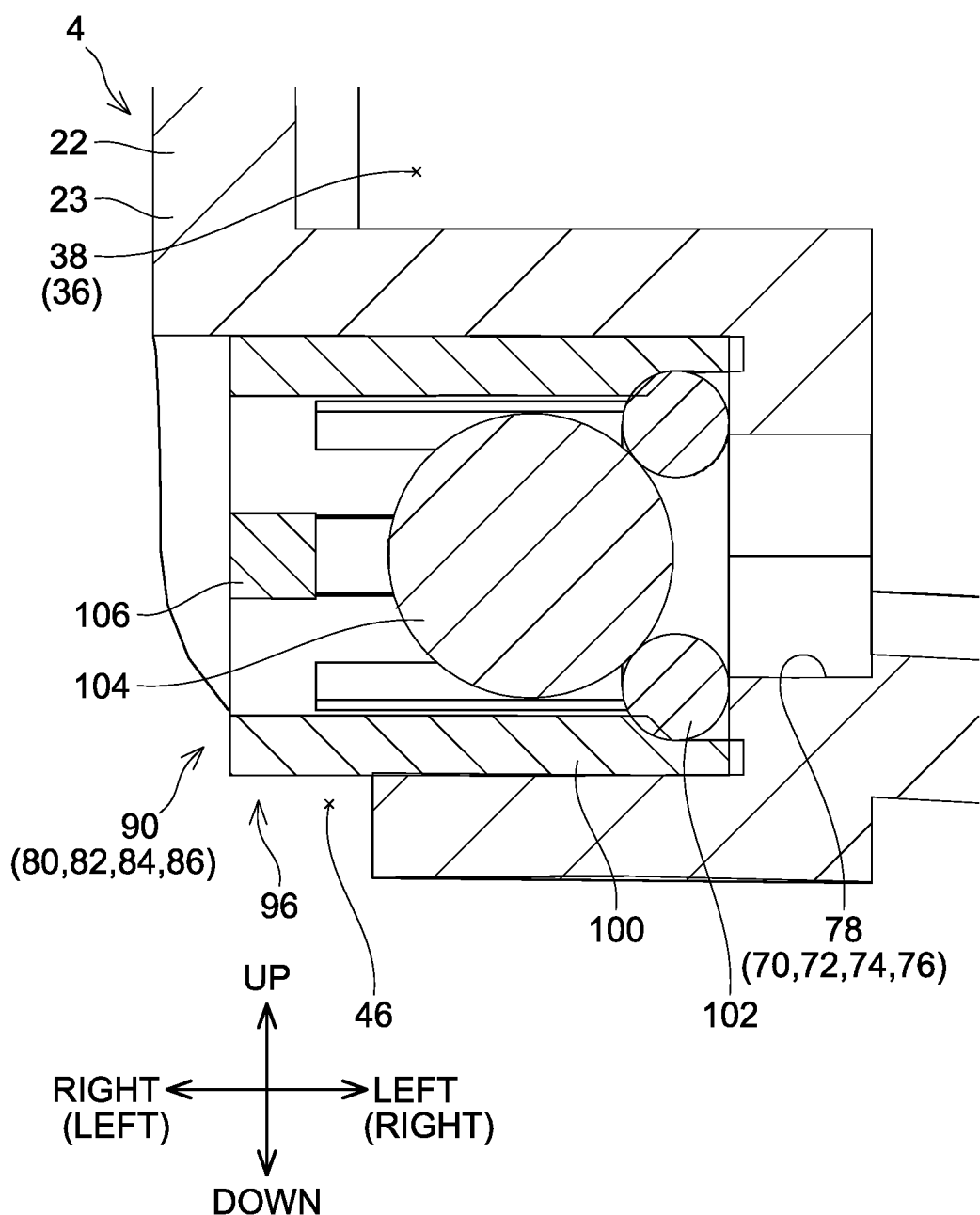

FIG. 8 is a cross-sectional view of the electric working machine 2 according to the embodiment in the vicinity of the one-way valve 90, where the communication opening 78 is closed.

Figure 9:
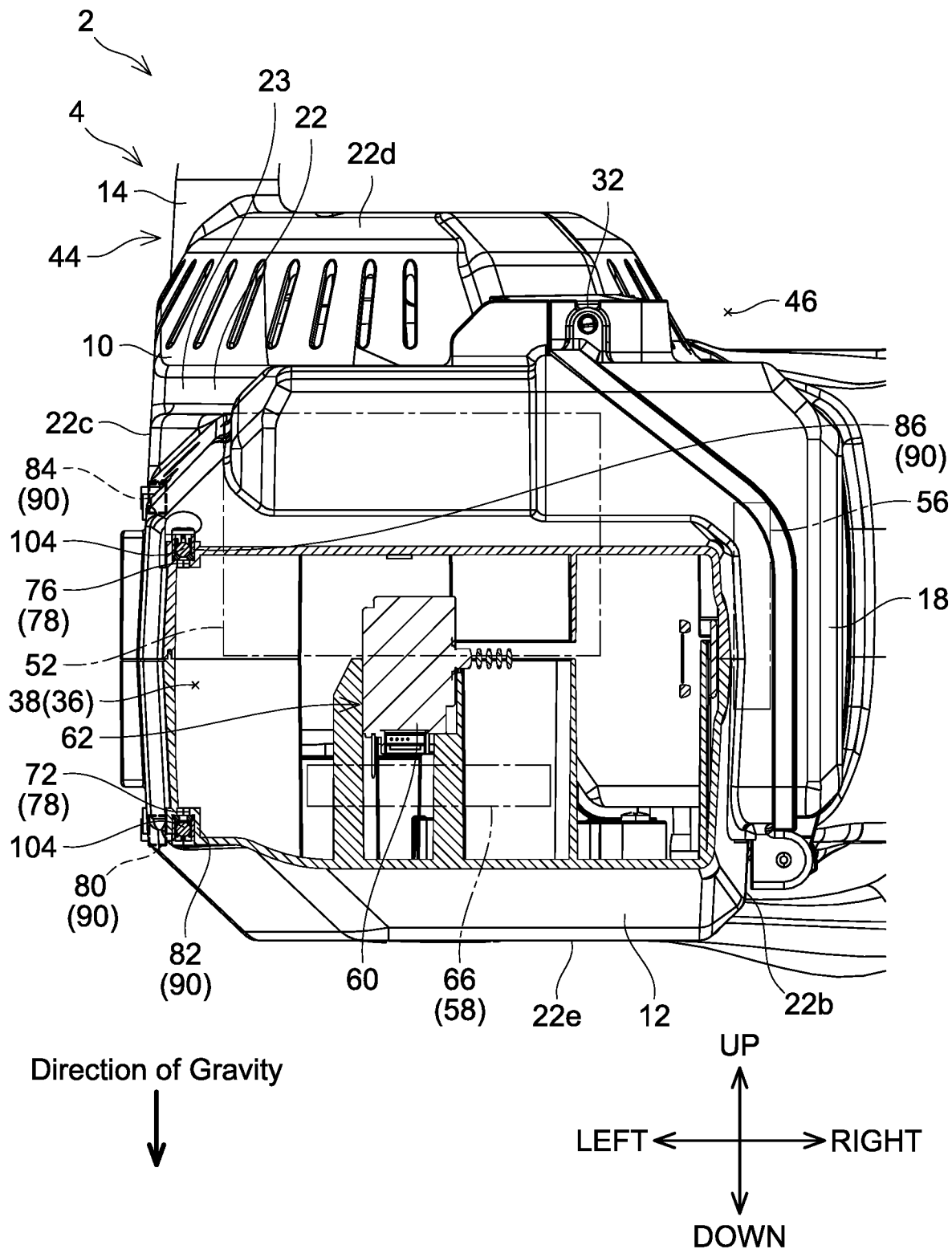

FIG. 9 is a cross-sectional view of the electric working machine 2 according to the embodiment in a first orientation.

Figure 10:
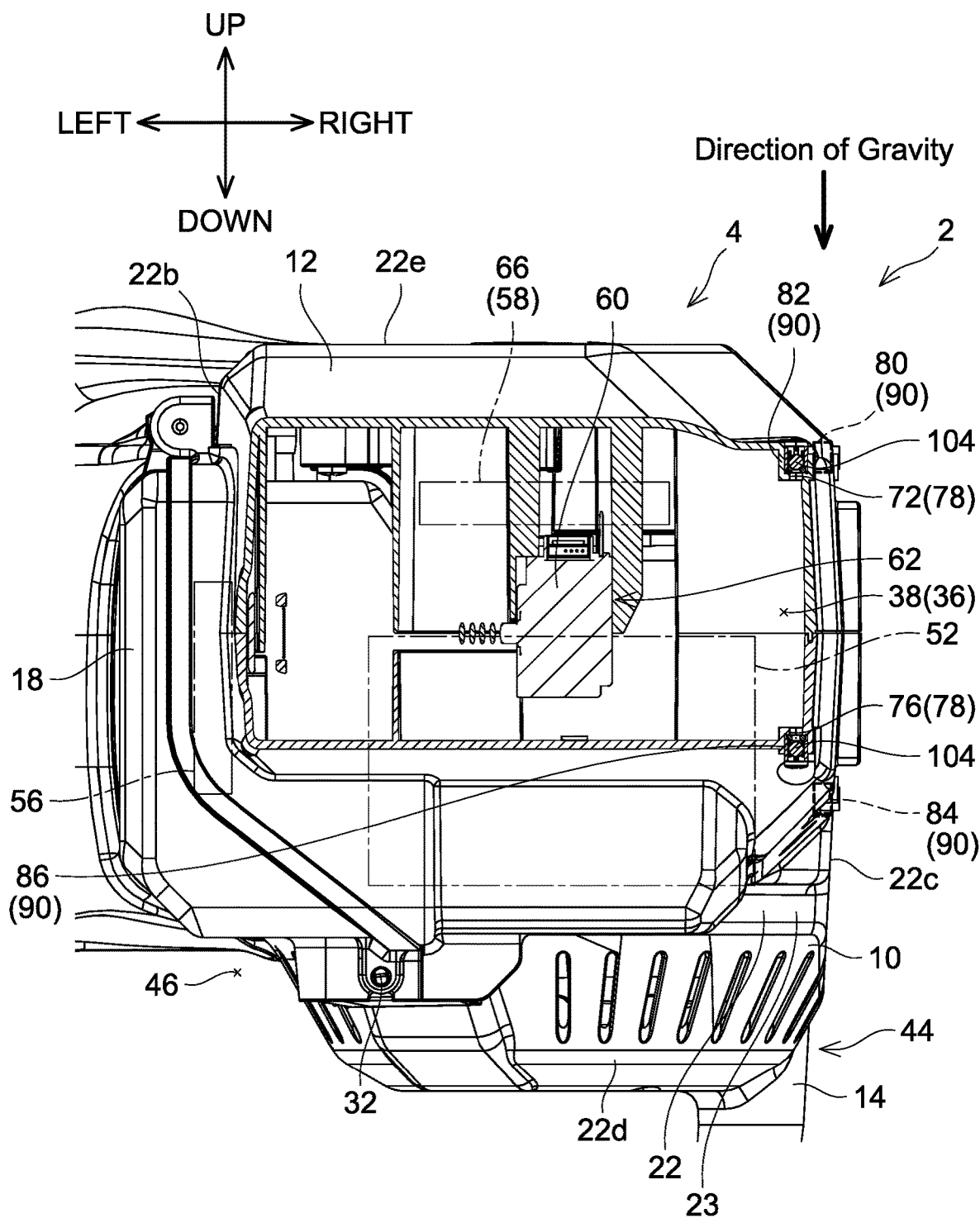

FIG. 10 is a cross-sectional view of the electric working machine 2 according to the embodiment in a second orientation.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved electric working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the first one-way valve may be configured to open and close according to an orientation of the electric working machine.

According to the configuration above, liquid can be discharged from the first space to the second space and entry of liquid into the first space from the second space can be suppressed simply by changing the orientation of the electric working machine.

In one or more embodiments, the partition wall may separate the first space from a third space different from the first space. The partition wall may further include a second communication opening communicating the first space and the third space. The electric working machine may further comprise a second one-way valve disposed at the second communication opening and configured to open and close according to the orientation of the electric working machine. When the electric working machine is in a first orientation, the first one-way valve may be open and the second one-way valve may be closed. When the electric working machine is in a second orientation, the first one-way valve may be closed and the second one-way valve may be open.

According to the configuration above, when the electric working machine is in the first orientation, liquid can be discharged from the first space to the second space through the first one-way valve and entry of liquid into the first space from the third space through the second one-way valve can be suppressed. Further, when the electric working machine is in the second orientation, liquid can be discharged from the first space to the third space through the second one-way valve and entry of liquid into the first space from the second space through the first one-way valve can be suppressed.

In one or more embodiments, when the electric working machine is in the first orientation, the first one-way valve may be positioned below the second one-way valve in a direction of gravity. When the electric working machine is in the second orientation, the second one-way valve may be positioned below the first one-way valve in the direction of gravity.

According to the configuration above, liquid within the first space can be concentrated to near the first one-way valve when the electric working machine is in the first orientation. The liquid can thus be discharged from the first space to the second space through the first one-way valve. Further, the liquid within the first space can be concentrated to near the second one-way valve when the electric working machine is in the second orientation. The liquid can thus be discharged from the first space to the third space through the second one-way valve.

In one or more embodiments, the second space and the third space may be the same.

According to the configuration above, liquid in the first space can be discharged to a single space.

In one or more embodiments, the electric working machine may further comprise a handle configured to be gripped by a user during use.

According to the configuration above, the user can easily change the orientation of the electric working machine by gripping the handle.

In one or more embodiments, the first one-way valve may be configured to open and close by gravity.

According to the configuration above, a pressure required to open and close the first one-way valve can be reduced, as compared with one-way valves configured to open and close by means other than gravity, such as a duckbill one-way valve, an umbrella one-way valve, etc. Since opening and closing of the first one-way valve is facilitated, discharge of liquid from the first space to the second space is facilitated.

In one or more embodiments, the electrical component may comprise an electrical connection member configured to electrically connect to a power supply source. When the electric working machine is in the first orientation, the first communication opening may be positioned below the electrical connection member in the direction of gravity.

According to the configuration above, when the electric working machine is in the first orientation, the electrical connection member can be suppressed from submerging in liquid and the liquid can be discharged from the first space to the second space.

In one or more embodiments, the electric working machine may further comprise a working unit. The electrical component may comprise a control unit configured to control operation of the working unit. When the electric working machine is in the first orientation, the first communication opening may be positioned below the control unit in the direction of gravity.

According to the configuration above, when the electric working machine is in the first orientation, the control unit can be suppressed from submerging in liquid and the liquid can be discharged from the first space to the second space.

In one or more embodiments, the partition wall may further include an air opening through which air flows into the first space. An opening area of the first communication opening may be smaller than an opening area of the air opening.

According to the configuration above, liquid can be discharged from the first space to the second space and entry of liquid into the first space from the second space can be suppressed, as well as a sufficient amount of air can flow into the first space through the air opening.

In one or more embodiments, the second space may be an outer space external to the electric working machine.

According to the configuration above, liquid in the first space can be discharged to the outside of the electric working machine.

EMBODIMENTS

Figure 1:
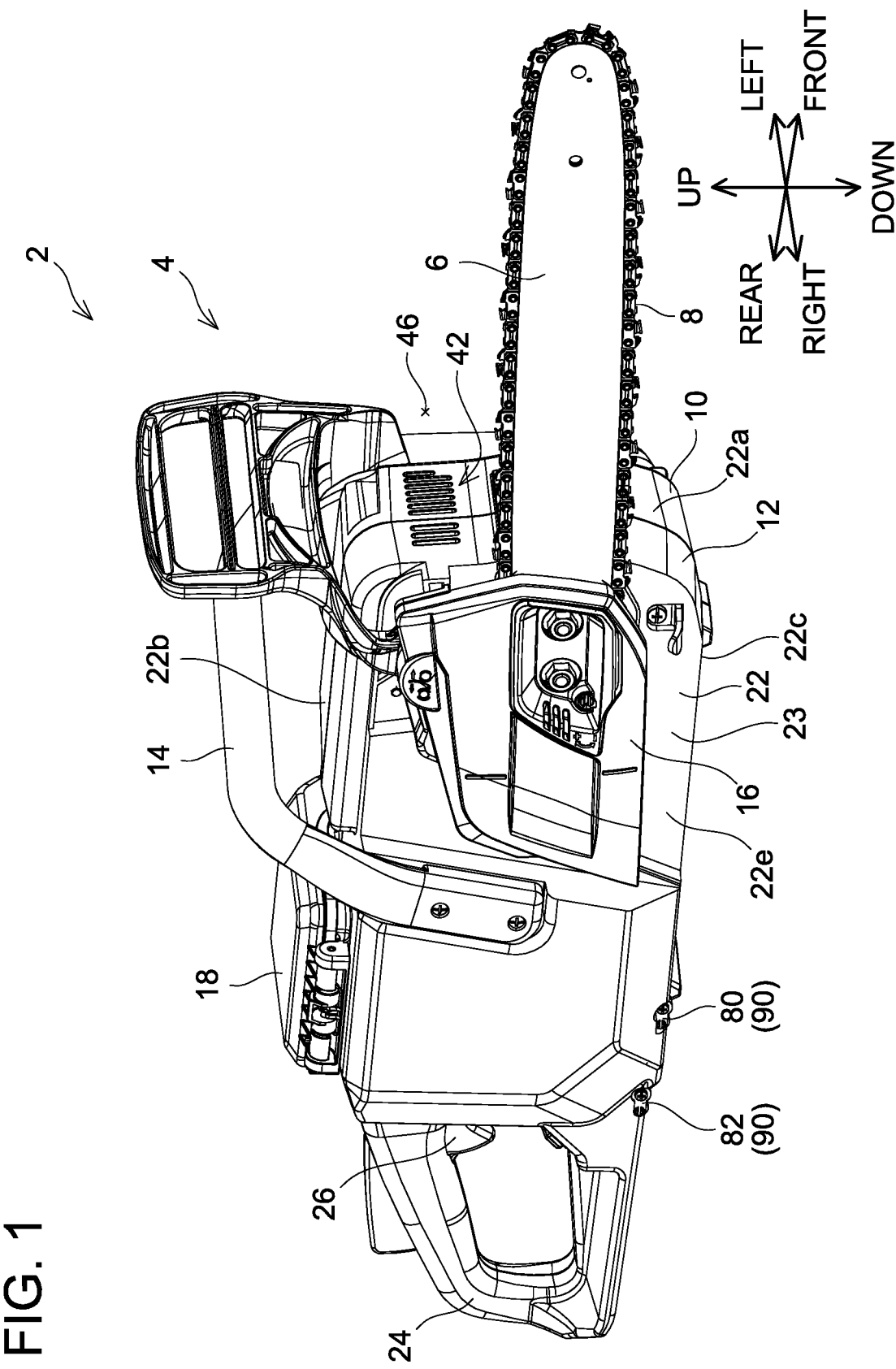
FIG. 1 is a perspective view of an electric working machine 2 according to an embodiment, as viewed from the right front side.

As illustrated in FIG. 1, an electric working machine 2 is, for example, a handheld chainsaw. The electric working machine 2 includes a body 4, a guide bar 6, and a saw chain 8. The guide bar 6 has an elongated plate shape. The guide bar 6 is attached to the body 4 to project from the body 4. The saw chain 8 includes a plurality of cutters connected to each other. The saw chain 8 is attached to the guide bar 6 along its periphery. A battery pack B (see FIG. 2) is attached to the body 4. The electric working machine 2 rotates the saw chain 8 along the periphery of the guide bar 6 using electrical power supplied from the battery pack B to cut objects such as wood, etc. In the following description, when the electric working machine 2 is placed on a plane P such as the ground as illustrated in FIG. 3, a direction perpendicular to the plane P is termed an up-down direction, a direction defined by projecting a longitudinal direction of the guide bar 6 onto the plane P is termed a front-rear direction, and a direction perpendicular to the up-down direction and the front-rear direction is termed a right-left direction.

Figure 2:
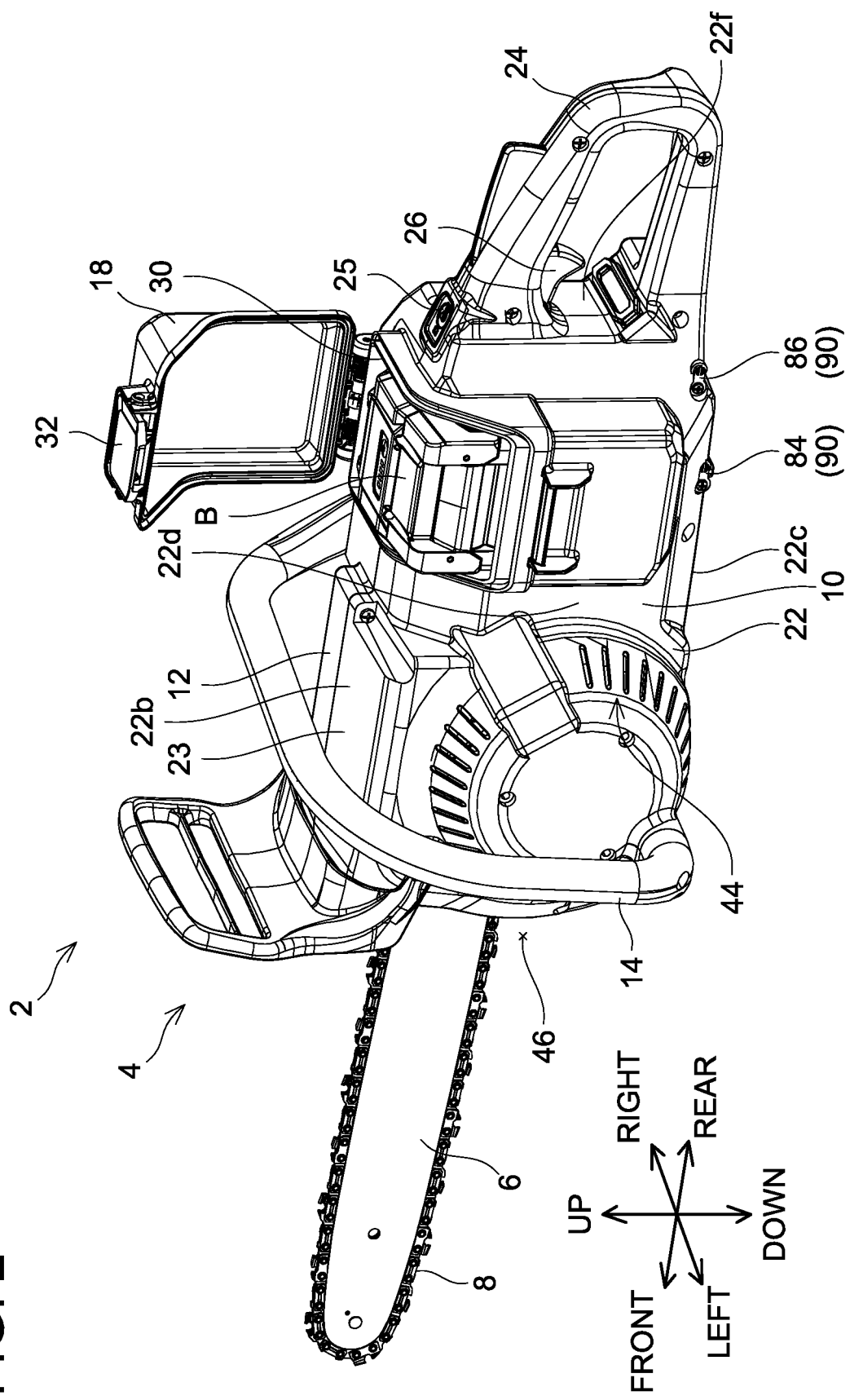
FIG. 2 is a perspective view of the electric working machine 2 according to the embodiment, as viewed from the left rear side.
Figure 3:
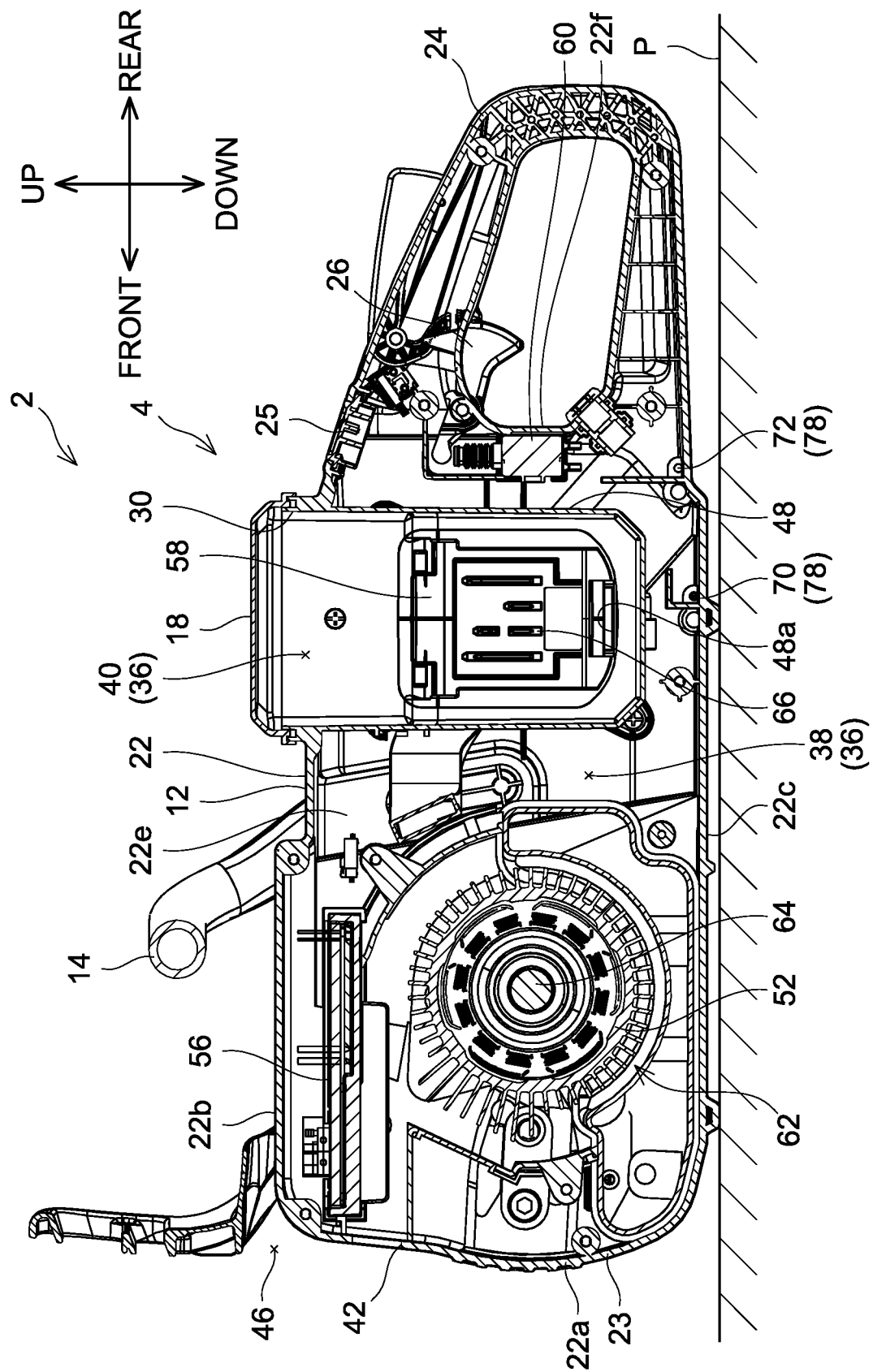
FIG. 3 is a cross-sectional view of the electric working machine 2 according to the embodiment.

As illustrated in FIGS. 1 and 2, the body 4 includes a left housing 10, a right housing 12, a front handle 14, a side cover 16, and a battery cover 18. The left housing 10 and the right housing 12 configure a body housing 22 and a rear handle 24. The left housing 10 defines outer shapes of left halves of the body housing 22 and the rear handle 24, while the right housing 12 defines outer shapes of right halves of the body housing 22 and the rear handle 24. The body housing 22 includes a front wall 22a, an upper wall 22b, a lower wall 22c, a left wall 22d, a right wall 22e, and a rear wall 22f. In the following description, the front wall 22a, the upper wall 22b, the lower wall 22c, the left wall 22d, the right wall 22e, and the rear wall 22f of the body housing 22 may be termed a partition wall 23.

As illustrated in FIG. 2, the rear handle 24 is connected to the rear wall 22f of the body housing 22. A main power switch 25 is disposed near the connection of the rear wall 22f of the body housing 22 to the rear handle 24. The main power switch 25 is switchable between an on-state and an off-state in response to operation by a user. A trigger 26 that is manipulatable by the user is disposed at the rear handle 24. When the trigger 26 is pushed in with the main power switch 25 being in the on-state, the saw chain 8 is rotated along the periphery of the guide bar 6. To the contrary, the saw chain 8 is not rotated along the periphery of the guide bar 6 even when the trigger 26 is pushed in with the main power switch 25 being in the off-state.

The front handle 14 extends upward from a lower front portion of the left wall 22d of the body housing 22, bends and extends rightward, further bends and extends downward, and then connects to the right wall 22e (see FIG. 1) of the body housing 22. The user can change the orientation of the electric working machine 2 by gripping the front handle 14 with one of his/her hands and gripping the rear handle 24 with the other hand.

The side cover 16 is detachably attached to a front portion of the right wall 22e of the body housing 22. A cover space 28 (see FIG. 4) is defined between the side cover 16 and the front portion of the right wall 22e of the body housing 22.

The battery cover 18 is pivotably attached to a rear portion of the upper wall 22b of the body housing 22. The battery cover 18 opens and closes a battery opening 30 defined in the upper wall 22b of the body housing 22. The battery opening 30 is defined in both an upper wall of the left housing 10 and an upper wall of the right housing 12. As illustrated in FIG. 1, the battery cover 18 closes the battery opening 30 while the user is using the electric working machine 2. As illustrated in FIG. 2, when an open knob 32 of the battery cover 18 is pushed by the user, the battery cover 18 pivots to open the battery opening 30. While the battery opening 30 is open, the user can remove the battery pack B from the body 4 or attach the battery pack B to the body 4.

Figure 4:
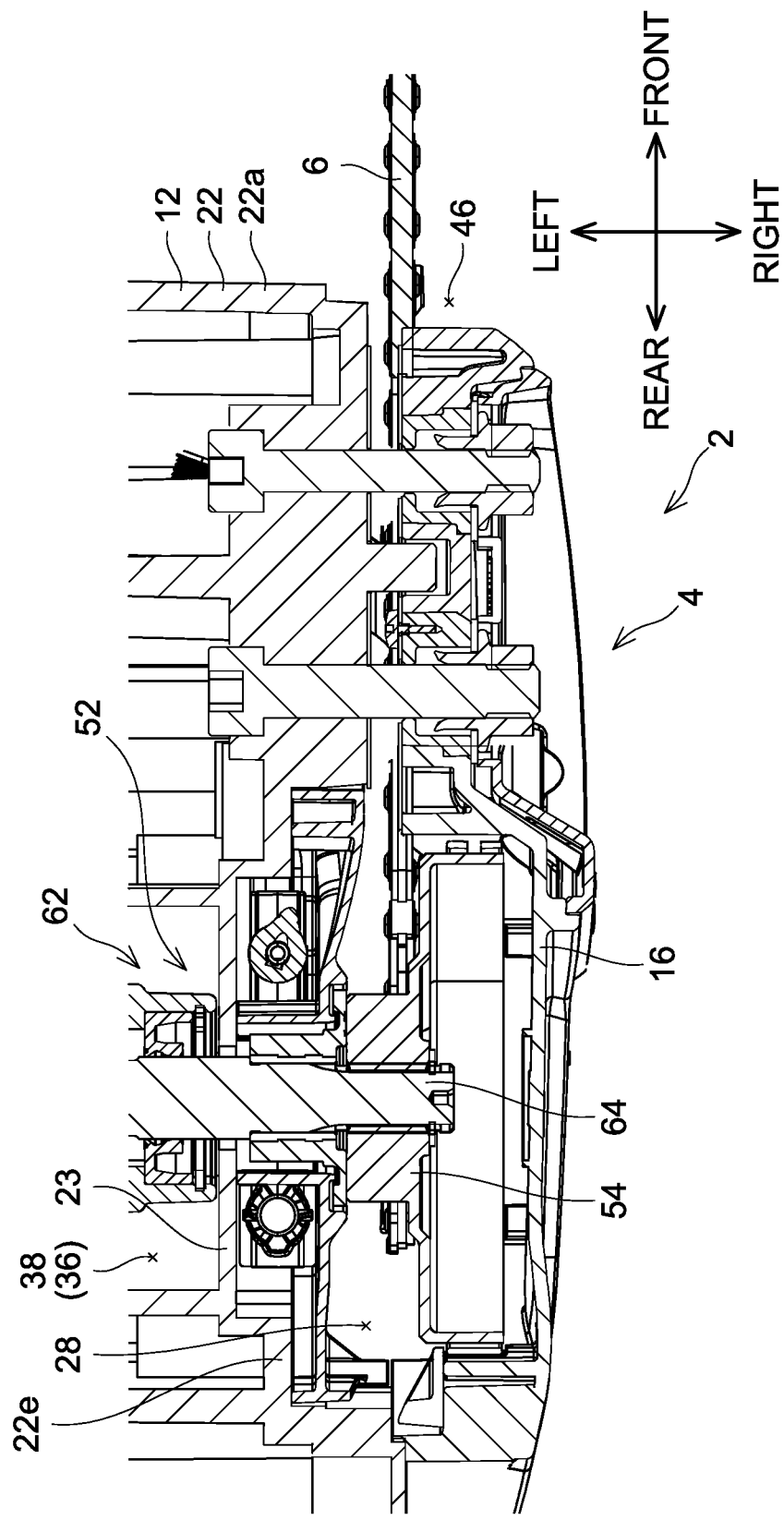
FIG. 4 is a cross-sectional view of the electric working machine 2 according to the embodiment in the vicinity of a sprocket 54.

As illustrated in FIG. 3, the body 4 defines an internal space 36 therein. FIG. 3 omits the depiction of the guide bar 6 and the saw chain 8. The internal space 36 includes a main internal space 38 and a secondary internal space 40. The main internal space 38 is defined by the partition wall 23 of the body housing 22 and the rear handle 24. The main internal space 38 communicates with an outer space 46 external to the body 4 through a front air opening 42 and a left air opening 44 (see FIG. 2). As illustrated in FIG. 1, the front air opening 42 is defined in the front wall 22a of the body housing 22. The front air opening 42 is an elongated opening having a longitudinal direction in the up-down direction. As illustrated in FIG. 2, the left air opening 44 is defined in the left wall 22d of the body housing 22. The left air opening 44 is disposed around the connection of the left wall 22d of the body housing 22 to the front handle 14. The left air opening 44 is an elongated opening. As illustrated in FIG. 4, the right wall 22e of the body housing 22 separates the main internal space 38 from the cover space 28.

As illustrated in FIG. 3, the secondary internal space 40 is defined by the body housing 22 and the battery cover 18. The body housing 22 includes an inner wall 48 and the inner wall 48 separates the main internal space 38 from the secondary internal space 40. The secondary internal space 40 communicates with the main internal space 38 through an opening 48a defined in the inner wall 48.

As illustrated in FIGS. 3 and 4, the electric working machine 2 includes a motor 52, a sprocket 54, a control unit 56, a battery attachment unit 58, and a trigger switch 60. In the following description, the motor 52, the control unit 56, the battery attachment unit 58, and the trigger switch 60 may be termed electrical components 62.

As illustrated in FIG. 3, the motor 52 is disposed in the main internal space 38. The motor 52 is, for example, a brushless motor. A cooling fan (not illustrated) is fixed to the motor 52. The motor 52 operates with electrical power from the battery pack B (see FIG. 2). When the motor 52 operates, the cooling fan is thereby rotated, causing air in the outer space 46 to flow into the main internal space 38 through the left air opening 44 (see FIG. 2). This air flows through the main internal space 38 and then flows out from the main internal space 38 to the outer space 46 through the front air opening 42. In this way, the motor 52 is cooled. A shaft 64 of the motor 52 extends in the right-left direction. As illustrated in FIG. 4, a right end of the shaft 64 is in the cover space 28.

The sprocket 54 is fixed to the right end of the shaft 64. The saw chain 8 (see FIG. 1) is hung over the sprocket 54 from the guide bar 6. When the motor 52 operates, the sprocket 54 rotates with the shaft 64. Thus, the saw chain 8 is rotated along the periphery of the guide bar 6.

As illustrated in FIG. 3, the control unit 56 is disposed in the main internal space 38. The control unit 56 is disposed closer to the upper wall 22b of the body housing 22 than the motor 52 and the sprocket 54 (see FIG. 4) are. The control unit 56 is electrically connected to the motor 52. The control unit 56 controls operation of the motor 52. The control unit 56 is cooled by air flowing into the main internal space 38 in association with the operation of the motor 52 (rotation of the cooling fan).

The battery attachment unit 58 is disposed in the secondary internal space 40. The battery attachment unit 58 is disposed closer to the rear wall 22f of the body housing 22 than the motor 52, the sprocket 54 (see FIG. 4), and the control unit 56 are. Further, the battery attachment unit 58 is disposed closer to the lower wall 22c of the body housing 22 than the control unit 56 is. When the battery pack B (see FIG. 2) is attached to the body 4 in the secondary internal space 40, the battery attachment unit 58 is electrically connected to the battery pack B via a battery attachment terminal 66 of the battery attachment unit 58. Further, the battery attachment unit 58 is electrically connected to the control unit 56.

The trigger switch 60 is disposed in the main internal space 38. The trigger switch 60 is disposed closer to the rear wall 22f of the body housing 22 than the battery attachment unit 58 is. Further, the trigger switch 60 is disposed closer to the lower wall 22c of the body housing 22 than the control unit 56 is. The trigger switch 60 is electrically connected to the control unit 56. When the trigger 26 is pushed in, the trigger switch 60 is pushed in by the trigger 26. When the trigger switch 60 is pushed in, the control unit 56 detects the push-in of the trigger 26.

As illustrated in FIGS. 5 and 6, a first front communication opening 70 and a first rear communication opening 72 are defined in a lower portion of the right wall 22e of the body housing 22 near its rear end, while a second front communication opening 74 and a second rear communication opening 76 are defined in a lower portion of the left wall 22d of the body housing 22 near its rear end. The first front communication opening 70, the first rear communication opening 72, the second front communication opening 74, and the second rear communication opening 76 are openings for discharging water in the internal space 36 (see FIG. 3) to the outer space 46. Opening areas of the first front communication opening 70, the first rear communication opening 72, the second front communication opening 74, and the second rear communication opening 76 are each smaller than each of an opening area of the front air opening 42 (see FIG. 1) and an opening area of the left air opening 44 (see FIG. 2). Further, diameters of the first front communication opening 70, the first rear communication opening 72, the second front communication opening 74, and the second rear communication opening 76 are each, for example, in a range from 0.5 mm to 15 mm. The first front communication opening 70, the first rear communication opening 72, the second front communication opening 74, and the second rear communication opening 76 have the same configuration. Thus, in the following description, the first front communication opening 70, the first rear communication opening 72, the second front communication opening 74, and the second rear communication opening 76 may simply be termed communication openings 78.

As illustrated in FIG. 5, the first front communication opening 70 and the first rear communication opening 72 are defined near a connection of the right wall 22e to the lower wall 22c of the body housing 22. The connection of the right wall 22e to the lower wall 22c of the body housing 22 corresponds to a corner of the body housing 22. As illustrated in FIG. 3, the first front communication opening 70 is positioned closer to the front wall 22a of the body housing 22 than the first rear communication opening 72 is. The position of the first front communication opening 70 in the front-rear direction is substantially coincident with the position of the battery attachment unit 58 in the front-rear direction. The first front communication opening 70 and the first rear communication opening 72 are positioned closer to the lower wall 22c of the body housing 22 than the electrical components 62 are. The first rear communication opening 72 is positioned closer to the rear wall 22f of the body housing 22 than the battery attachment unit 58 is.

As illustrated in FIG. 6, the second front communication opening 74 and the second rear communication opening 76 are defined near a connection of the left wall 22d to the lower wall 22c of the body housing 22. The connection of the left wall 22d to the lower wall 22c of the body housing 22 corresponds to a corner of the body housing 22. The second front communication opening 74 is positioned closer to the front wall 22a (see FIG. 3) of the body housing 22 than the second rear communication opening 76 is. The second front communication opening 74 faces the first front communication opening 70 in the right-left direction and the second rear communication opening 76 faces the first rear communication opening 72 in the right-left direction, although this is not illustrated. Thus, the position of the second front communication opening 74 in the front-rear direction is substantially coincident with the position of the battery attachment unit 58 in the front-rear direction, the second front communication opening 74 and the second rear communication opening 76 are positioned closer to the lower wall 22c (see FIG. 3) of the body housing 22 than the electrical components 62 (see FIG. 3) are, and the second rear communication opening 76 is positioned closer to the rear wall 22f of the body housing 22 than the battery attachment unit 58 (see FIG. 3) is.

As illustrated in FIGS. 5 and 6, the electric working machine 2 further includes a first front one-way valve 80, a first rear one-way valve 82, a second front one-way valve 84, and a second rear one-way valve 86. As illustrated in FIG. 5, the first front one-way valve 80 is disposed at the first front communication opening 70. The first front one-way valve 80 is fixed to the right wall 22e of the body housing 22. The first rear one-way valve 82 is disposed at the first rear communication opening 72. The first rear one-way valve 82 is fixed to the right wall 22e of the body housing 22. As illustrated in FIG. 6, the second front one-way valve 84 is disposed at the second front communication opening 74. The second front one-way valve 84 is fixed to the left wall 22d of the body housing 22. The second rear one-way valve 86 is disposed at the second rear communication opening 76. The second rear one-way valve 86 is fixed to the left wall 22d of the body housing 22.

The first front one-way valve 80, the first rear one-way valve 82, the second front one-way valve 84, and the second rear one-way valve 86 illustrated in FIGS. 5 and 6 have the same configuration. Thus, in the following description, the first front one-way valve 80, the first rear one-way valve 82, the second front one-way valve 84, and the second rear one-way valve 86 may simply be termed one-way valves 90.

The one-way valves 90 are ball one-way valves. Each one-way valve 90 includes a fixation portion 92, a connection portion 94, and a valve portion 96. The fixation portion 92 has a screw hole 92a penetrating the fixation portion 92 in a thickness direction (in the right-left direction in FIGS. 5 and 6). The screw hole 92a allows a screw 98 to be inserted therein. The screw 98 is inserted in the screw hole 92a and then the screw 98 is screwed into the housing 22, as a result of which the one-way valve 90 is fixed to the body housing 22.

The valve portion 96 is connected to the fixation portion 92 via the connection portion 94. The valve portion 96 includes a base portion 100, a sealing portion 102, and a ball portion 104 (see FIG. 7).

The base portion 100 has a substantially cylindrical shape. A stopper 106 is formed at one end of the base portion 100. The stopper 106 closes a part of an opening of the base portion 100 at the one end. The stopper 106 prohibits the ball portion 104 from moving from the inside of the base portion 100 to the outside of the base portion 100, while permitting water to move from the inside of the base portion 100 to the outside of the base portion 100. As illustrated in FIG. 7, the base portion 100 is disposed at a communication opening 78. The other end of the base portion 100 is in contact with the body housing 22.

The sealing portion 102 is disposed at the communication opening 78. The sealing portion 102 is interposed between the base portion 100 and the body housing 22. The sealing portion 102 is constituted, for example, of an elastic material. The sealing portion 102 has an annular shape and, in the present embodiment, is an O-ring.

The ball portion 104 is disposed within the base portion 100. The ball portion 104 is movable between the stopper 106 and the sealing portion 102. For example, the ball potion 104 moves between the stopper 106 and the sealing portion 102 according to the orientation of the electric working machine 2. Further, the ball portion 104 moves in the direction of gravity by gravity acting on the ball portion 104. When the ball portion 104 is in contact with the sealing portion 102 as illustrated in FIG. 8, the one-way valve 90 is closed and thus the communication opening 78 is closed. Thus, the communication between the main internal space 38 and the outer space 46 is blocked. In this instance, water cannot enter the internal space 36 from the outer space 46 through the one-way valve 90 and the communication opening 78. When the ball portion 104 is not in contact with the sealing portion 102 as illustrated in FIG. 7, for example, when the ball portion 104 is in contact with the stopper 106, the one-way valve 90 is open and thus the communication opening 78 is open. Thus, the main internal space 38 is in communication with the outer space 46 through the communication opening 78. In this instance, water within the internal space 36 can be discharged to the outer space 46 through the communication opening 78 and the one-way valve 90.

Next, orientations the electric working machine 2 can assume when cutting an object will be described. The electric working machine 2 illustrated in FIG. 1 is often used to cut wood. Since trees extend vertically upward from the ground, the electric working machine 2 is used not in the placement orientation illustrated in FIG. 3 (in the orientation where the lower wall 22c of the body housing 22 faces the plane P) but in a first orientation or a second orientation most of the time. When the electric working machine 2 is in the first orientation as illustrated in FIG. 9, the right wall 22e of the body housing 22 is oriented downward (in the direction of gravity), the left wall 22d of the body housing 22 is oriented upward, the lower wall 22c of the body housing 22 is oriented leftward, the upper wall 22b of the body housing 22 is oriented rightward, the front wall 22a (see FIG. 1) of the body housing 22 is oriented forward, and the rear wall 22f (see FIG. 2) of the body housing 22 is oriented rearward. When the electric working machine 2 is in the second orientation as illustrated in FIG. 10, the left wall 22d of the body housing 22 is oriented downward (in the direction of gravity), the right wall 22e of the body housing 22 is oriented upward, the upper wall 22b of the body housing 22 is oriented leftward, the lower wall 22c of the body housing 22 is oriented rightward, the front wall 22a of the body housing 22 is oriented forward, and the rear wall 22f of the body housing 22 is oriented rearward. The second orientation is opposite to the first orientation.

In FIGS. 9 and 10, the positions of the first front one-way valve 80 and the second front one-way valve 84 are indicated with dashed lines, and the positions of the motor 52, the control unit 56, and the battery attachment terminal 66 are indicated with dashed-dotted lines.

As illustrated in FIG. 9, when the electric working machine 2 is in the first orientation, the first rear one-way valve 82 is positioned below the second rear one-way valve 86 and the first front one-way valve 80 is positioned below the second front one-way valve 84. The first front one-way valve 80 and the first rear one-way valve 82 are positioned below the motor 52, the control unit 56, the trigger switch 60, and the battery attachment terminal 66. The second front one-way valve 84 and the second rear one-way valve 86 are positioned above a lower half of the control unit 56, the trigger switch 60, and the battery attachment terminal 66.

As illustrated in FIG. 7, when the electric working machine 2 is in the first orientation, the ball portions 104 are in contact with the stoppers 106 in the first front one-way valve 80 and the first rear one-way valve 82. Since the first front one-way valve 80 and the first rear one-way valve 82 are open, the internal space 36 is in communication with the outer space 46 through the first front communication opening 70 and the first rear communication opening 72. Further, as illustrated in FIG. 8, the ball portions 104 are in contact with the sealing portions 102 in the second front one-way valve 84 and the second rear one-way valve 86. Since the second front one-way valve 84 and the second rear one-way valve 86 are closed, the internal space 36 is not in communication with the outer space 46 through the second front communication opening 74 and the second rear communication opening 76.

When the electric working machine 2 is used in the first orientation, as illustrated in FIG. 9, to cut a tree outdoors during rain, rainwater enters the internal space 36 from the outer space 46 through the front air opening 42 (see FIG. 1) and the left air opening 44. The rainwater concentrates to the right wall 22e of the body housing 22, for example, to the corner which is the connection of the right wall 22e to the lower wall 22c of the body housing 22, by gravity. Since the first front one-way valve 80 and the first rear one-way valve 82 are open, the rainwater that has concentrated to the corner is discharged from the internal space 36 to the outer space 46 through the first front communication opening 70 and the first rear communication opening 72. Further, since the second front one-way valve 84 and the second rear one-way valve 86 are closed, rainwater does not enter the internal space 36 from the outer space 46 through the second front communication opening 74 and the second rear communication opening 76. Thus, the control unit 56, the trigger switch 60, and the battery attachment terminal 66 are suppressed from contacting rainwater.

As illustrated in FIG. 10, when the electric working machine 2 is in the second orientation, the second rear one-way valve 86 is positioned below the first rear one-way valve 82 and the second front one-way valve 84 is positioned below the first front one-way valve 80. The second front one-way valve 84 and the second rear one-way valve 86 are positioned below an upper half of the control unit 56, the trigger switch 60, and the battery attachment terminal 66. The first front one-way valve 80 and the first rear one-way valve 82 are positioned above the control unit 56, the trigger switch 60, and the battery attachment terminal 66.

As illustrated in FIG. 7, when the electric working machine 2 is in the second orientation, the ball portions 104 are in contact with the stoppers 106 in the second front one-way valve 84 and the second rear one-way valve 86. Since the second front one-way valve 84 and the second rear one-way valve 86 are open, the internal space 36 is in communication with the outer space 46 through the second front communication opening 74 and the second rear communication opening 76. Further, as illustrated in FIG. 8, the ball portions 104 are in contact with the sealing portions 102 in the first front one-way valve 80 and the first rear one-way valve 82. Since the first front one-way valve 80 and the first rear one-way valve 82 are closed, the internal space 36 is not in communication with the outer space 46 through the first front communication opening 70 and the first rear communication opening 72.

When the electric working machine 2 is used in the second orientation, as illustrated in FIG. 10, to cut a tree outdoors during rain, rainwater enters the internal space 36 from the outer space 46 through the front air opening 42 (see FIG. 1). The rainwater concentrates to the left wall 22d of the body housing 22, for example, to the corner which is the connection of the left wall 22d to the lower wall 22c of the body housing 22. Since the second front one-way valve 84 and the second rear one-way valve 86 are open, the rainwater that has concentrated to the corner is discharged from the internal space 36 to the outer space 46 through the second front communication opening 74 and the second rear communication opening 76. Further, since the first front one-way valve 80 and the first rear one-way valve 82 are closed, rainwater does not enter the internal space 36 from the outer space 46 through the first front communication opening 70 and the first rear communication opening 72. Thus, the motor 52, the control unit 56, the trigger switch 60, and the battery attachment terminal 66 are suppressed from contacting rainwater.

(Effects)

The electric working machine 2 according to the present embodiment includes the electrical components 62; the internal space 36 (an example of first space) in which the electrical components 62 are disposed; the partition wall 23 separating the internal space 36 from the outer space 46 (an example of second space) different from the internal space 36 and including the first front communication opening 70 (an example of first communication opening) communicating the internal space 36 and the outer space 46; and the first front one-way valve 80 (an example of first one-way valve) disposed at the first front communication opening 70.

According to the configuration above, when liquid is in the internal space 36, opening the first front one-way valve 80 allows the liquid to be discharged from the internal space 36 to the outer space 46 through the first front one-way valve 80. Further, when liquid is in the outer space 46, closing the first front one-way valve 80 suppresses entry of the liquid into the internal space 36 from the outer space 46 through the first front one-way valve 80.

Further, the first front one-way valve 80 opens and closes according to the orientation of the electric working machine 2.

According to the configuration above, liquid can be discharged from the internal space 36 to the outer space 46 and entry of liquid into the internal space 36 from the outer space 46 can be suppressed simply by changing the orientation of the electric working machine 2.

Further, the partition wall 23 separates the internal space 36 from the outer space 46 (an example of third space) different from the internal space 36. The partition wall 23 further includes the second front communication opening 74 (an example of second communication opening) communicating the internal space 36 and the outer space 46. The electric working machine 2 further includes the second front one-way valve 84 (an example of second one-way valve) disposed at the second front communication opening 74 and configured to open and close according to the orientation of the electric working machine 2. When the electric working machine 2 is in the first orientation, the first front one-way valve 80 is open and the second front one-way valve 84 is closed. When the electric working machine 2 is in the second orientation, the first front one-way valve 80 is closed and the second front one-way valve 84 is open.

According to the configuration above, when the electric working machine 2 is in the first orientation, liquid can be discharged from the internal space 36 to the outer space 46 through the first front one-way valve 80 and entry of liquid into the internal space 36 from the outer space 46 through the second front one-way valve 84 can be suppressed. Further, when the electric working machine 2 is in the second orientation, liquid can be discharged from the internal space 36 to the outer space 46 through the second front one-way valve 84 and entry of liquid into the internal space 36 from the outer space 46 through the first front one-way valve 80 can be suppressed.

Further, when the electric working machine 2 is in the first orientation, the first front one-way valve 80 is positioned below the second front one-way valve 84 in the direction of gravity. When the electric working machine 2 is in the second orientation, the second front one-way valve 84 is positioned below the first front one-way valve 80 in the direction of gravity.

According to the configuration above, liquid within the internal space 36 can be concentrated to near the first front one-way valve 80 when the electric working machine 2 is in the first orientation. The liquid can thus be discharged from the internal space 36 to the outer space 46 through the first front one-way valve 80. Further, the liquid within the internal space 36 can be concentrated to near the second front one-way valve 84 when the electric working machine 2 is in the second orientation. The liquid can thus be discharged from the internal space 36 to the outer space 46 through the second front one-way valve 84.

The space with which the internal space 36 communicates through the first front communication opening 70 and the space with which the internal space 36 communicates through the second front communication opening 74 are the same outer space 46.

According to the configuration above, liquid in the internal space 36 can be discharged to the single space.

Further, the electric working machine 2 further includes the front handle 14 and the rear handle 24 (an example of handle) configured to be gripped by the user during use.

According to the configuration above, the user can easily change the orientation of the electric working machine 2 by gripping the front handle 14 and the rear handle 24.

Further, the first front one-way valve 80 is configured to open and close by gravity.

According to the configuration above, a pressure required to open and close the first front one-way valve 80 can be reduced, as compared with one-way valves configured to open and close by means other than gravity, such as a duckbill one-way valve, an umbrella one-way valve, etc. Since opening and closing of the first front one-way valve 80 is facilitated, discharge of liquid from the internal space 36 to the outer space 46 is facilitated.

Further, the electrical components 62 include the battery attachment terminal 66 (an example of electrical connection member) configured to electrically connect to the battery pack B (an example of power supply source). When the electric working machine 2 is in the first orientation, the first front communication opening 70 is positioned below the battery attachment terminal 66 in the direction of gravity.

According to the configuration above, when the electric working machine 2 is in the first orientation, the battery attachment terminal 66 can be suppressed from submerging in liquid and the liquid can be discharged from the internal space 36 to the outer space 46.

Further, the electric working machine 2 further includes the saw chain 8 (an example of working unit). The electrical components 62 include the control unit 56 configured to control operation of the saw chain 8. When the electric working machine 2 is in the first orientation, the first front communication opening 70 is positioned below the control unit 56 in the direction of gravity.

According to the configuration above, when the electric working machine 2 is in the first orientation, the control unit 56 can be suppressed from submerging in liquid and the liquid can be discharged from the internal space 36 to the outer space 46.

Further, the partition wall 23 further includes the front air opening 42 (an example of air opening) through which air flows into the internal space 36. The opening area of the first front communication opening 70 is smaller than the opening area of the front air opening 42.

According to the configuration above, liquid can be discharged from the internal space 36 to the outer space 46 and entry of liquid into the internal space 36 from the outer space 46 can be suppressed, as well as a sufficient amount of air can flow into the internal space 36 through the front air opening 42.

Further, the outer space 46 is external to the electric working machine 2.

According to the configuration above, liquid in the internal space 36 can be discharged to the outside of the electric working machine 2.

In one embodiment of the electric working machine 2, the number of the one-way valves 90 is not limited to four but may be three or less, or five or more.

In one embodiment of the electric working machine 2, the one-way valves 90 are not limited to ball one-way valves but may be one-way valves of another type, such as duckbill one-way valves or umbrella one-way valves.

In one embodiment of the electric working machine 2, the space with which the internal space 36 communicates through the first front communication opening 70 may be different from the space with which the internal space 36 communicates through the second front communication opening 74. For example, the space with which the internal space 36 communicates through the first front communication opening 70 may be the cover space 28 and the space with which the internal space 36 communicates through the second front communication opening 74 may be the outer space 46.

In one embodiment of the electric working machine 2, the electric working machine 2 is not limited to a handheld chain saw but may be a handheld electric working machine of another type, such as a pole saw, a blower, a grass cutter, a high-pressure washer, a spray, or a hedge trimmer. Alternatively, the electric working machine 2 is not limited to a handheld electric working machine but may be a push-along electric working machine or a ride-on electric working machine, such as a lawn mower, a scarifier, or a tiller.

In one embodiment of the electric working machine 2, the electric working machine 2 may include a built-in battery. Alternatively, the electric working machine 2 may supply electric power to the motor 52 from an external power supply via a power cable.

What is claimed is:

1. An electric working machine comprising:
   at least one electrical component;
   a first space in which the at least one electrical component is disposed;
   a partition wall separating the first space from a second space different from the first space, the partition wall including a first communication opening communicating the first space and the second space; and
   a first one-way valve disposed at the first communication opening,
   wherein:
   the first one-way valve is configured to open and close according to an orientation of the electric working machine,
   the partition wall separates the first space from a third space different from the first space,
   the partition wall further includes a second communication opening communicating the first space and the third space,
   the electric working machine further comprises a second one-way valve disposed at the second communication opening and configured to open and close according to the orientation of the electric working machine,
   when the electric working machine is in a first orientation, the first one-way valve is open and the second one-way valve is closed, and
   when the electric working machine is in a second orientation, the first one-way valve is closed and the second one-way valve is open.

2. The electric working machine according to claim 1, wherein:
   when the electric working machine is in the first orientation, the first one-way valve is positioned below the second one-way valve in a direction of gravity, and
   when the electric working machine is in the second orientation, the second one-way valve is positioned below the first one-way valve in the direction of gravity.

3. The electric working machine according to claim 1, wherein the second space and the third space are the same.

4. The electric working machine according to claim 1, further comprising a handle configured to be gripped by a user during use.

5. The electric working machine according to claim 1, wherein the first one-way valve is configured to open and close by gravity.

6. The electric working machine according to claim 1, wherein:
   the at least one electrical component comprises an electrical connection member configured to electrically connect to a power supply source, and
   when the electric working machine is in the first orientation, the first communication opening is positioned below the electrical connection member in a direction of gravity.

7. The electric working machine according to claim 1, further comprising a working unit,
   wherein:
   the at least one electrical component comprises a control unit configured to control operation of the working unit, and
   when the electric working machine is in the first orientation, the first communication opening is positioned below the control unit in a direction of gravity.

8. The electric working machine according to claim 1, wherein:
   the partition wall further includes an air opening through which air flows into the first space, and
   an opening area of the first communication opening is smaller than an opening area of the air opening.

9. The electric working machine according to claim 1, wherein the second space is an outer space external to the electric working machine.

10. The electric working machine according to claim 2, wherein: the second space and the third space are the same,
   the electric working machine further comprises a handle configured to be gripped by a user during use,
   the first one-way valve is configured to open and close by gravity,
   the at least one electrical component comprises an electrical connection member configured to electrically connect to a power supply source,
   when the electric working machine is in the first orientation, the first communication opening is positioned below the electrical connection member in the direction of gravity,
   the electric working machine further comprises a working unit,
   the at least one electrical component comprises a control unit configured to control operation of the working unit,
   when the electric working machine is in the first orientation, the first communication opening is positioned below the control unit in the direction of gravity,
   the partition wall further includes an air opening through which air flows into the first space,
   an opening area of the first communication opening is smaller than an opening area of the air opening, and
   the second space is an outer space external to the electric working machine.

* * * * *